Feb. 8, 1927.    1,617,276
F. M. SARFF
WHEEL BRAKE
Original Filed Jan. 24, 1925   2 Sheets-Sheet 2
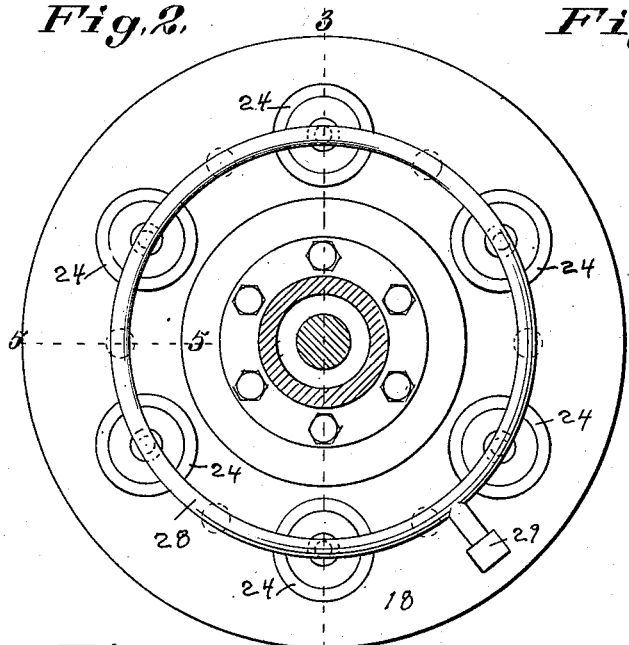
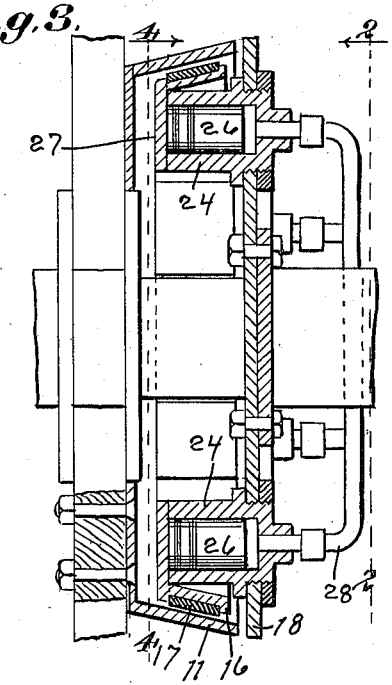
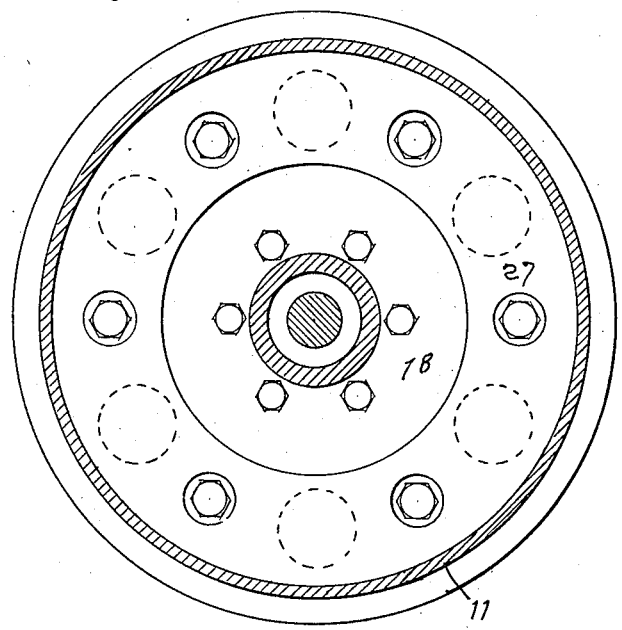
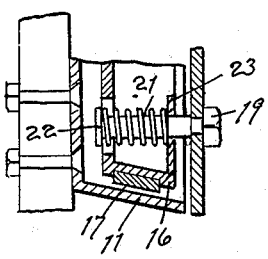
Inventor,
FOREST M. SARFF
By Victor J. Evans
Attorney.

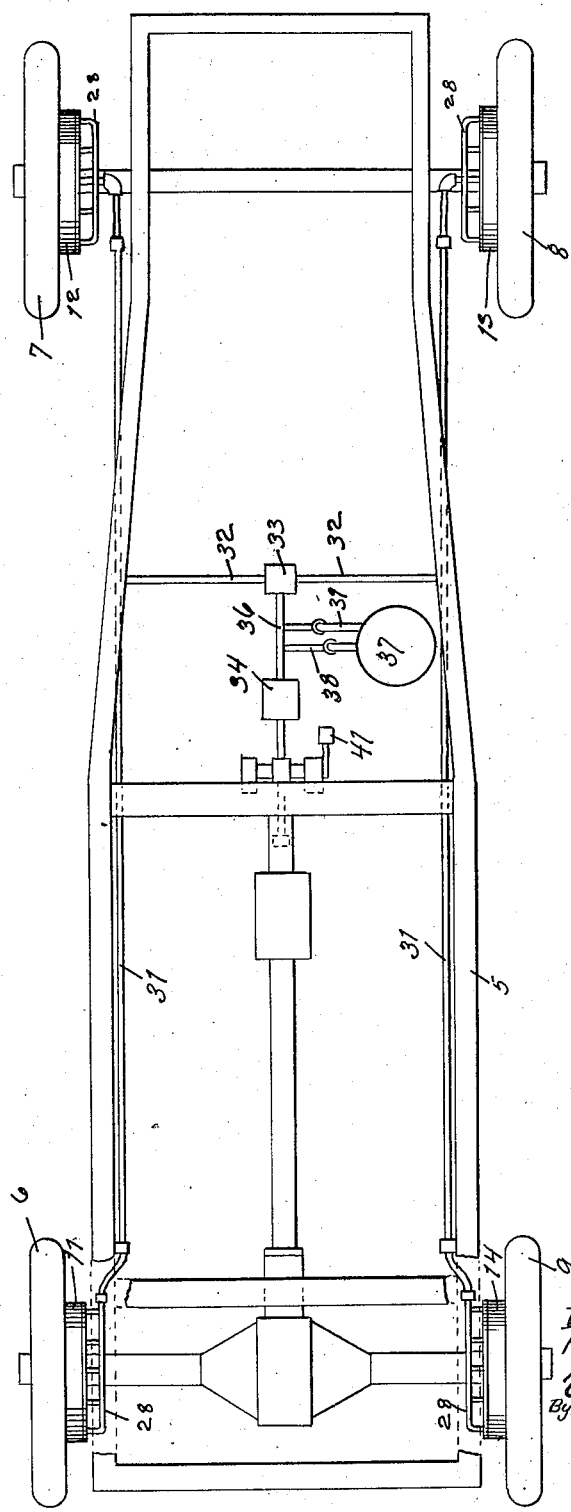

Patented Feb. 8, 1927.

1,617,276

UNITED STATES PATENT OFFICE.

FOREST M. SARFF, OF LOS ANGELES, CALIFORNIA.

WHEEL BRAKE.

Original application filed January 24, 1925, Serial No. 4,545. Divided and this application filed March 12, 1926. Serial No. 94,242.

This invention relates to improvements in brakes and has particular reference to a hydraulic brake capable of use with an automobile.

The principal object of this invention is to provide means for applying hydraulic brakes to the four wheels of an automobile and, at the same time, exerting an equal pressure on all points of the brakes.

Another object of this invention is to produce a device of this character which is simple in construction and one which may be applied to any automobile now upon the market, without materially altering the construction of the same.

The subject matter of this invention is disclosed in my co-pending application for hydraulic brake systems, filed January 24th, 1925, and bearing Serial Number 4,545, but is not claimed therein, the present application being a division of the said application Serial Number 4,545.

Other objects and advantages will be apparent during the course of the following description.

In the accompanying drawings forming a part of this specification, and in which like numerals are employed to designate like parts throughout the same, Figure 1 is a top plan view of an automobile chassis having my invention applied thereto, Figure 2 is an enlarged detail view in side elevation looking in the direction of the arrow and taken on the line 2—2 of Figure 3, Figure 3 is a vertical cross section taken on the line 3—3 of Figure 2, Figure 4 is a vertical cross section taken on the line 4—4 of Figure 3, and Figure 5 is a fragmentary detail view taken on the line 5—5 of Figure 2.

In providing a brake, it is essential that the brake lining should contact evenly with the surface against which it is to rub; otherwise, excessive wear will take place in spots, resulting in faulty brakes with its consequent serious results. I have, therefore, produced a brake having a plurality of cylinders which are adapted to bring the two parts of the brake together with an even pressure at all points, thereby effecting a much better braking force.

In the accompanying drawings wherein for the purpose of illustration is shown a preferred embodiment of my invention, the numeral 5 designates the chassis of a vehicle. The numerals 6, 7, 8 and 9 the wheels thereof, to which wheels are connected brake drums 11, 12, 13 and 14, respectively.

Mounted within each of these drums is a cone 16 having a brake lining 17, which cone is attached through the medium of a plurality of bolts 19 to a plate 18 secured to the axle of the automobile (see Figure 5).

Coiled upon each of these bolts is a spring 21 which is confined between the head 22 and the flange 23 of the cone, therefore, the spring 21 serves to normally maintain the cone 16 out of engagement with the brake drum, with which it is associated. The plate 18 carries a plurality of cylinders 24 preferably six in number. These cylinders each have confined within themselves a piston 26 (see Figure 3).

These pistons contact a flange 27 of the cone 16 so that when fluid pressure is conducted to the cylinders 24 the pistons will move the cone outwardly against the drum 11. Fluid pressure is conducted to each of the cylinders 24 by a manifold ring 28, which is connected by a union 29 to a supply pipe 31.

There are two of these supply pipes positioned on opposite sides of the chassis which are, in turn, connected by a cross pipe 32 to an equalizing chamber 33. At 34 I have shown a cylinder which is attached to the equalizing chamber 33 as by a pipe 36 and at 37 I have shown a supply tank connected to the pipe 36, as by pipes 38 and 39.

Within each supply tank pipe, valves are located so that the system will be constantly maintained full of oil or other fluid. The cylinder 34 has a piston therein which is operated by the customary brake pedal 41.

The operation of my device is as follows:—

When the brake pedal 41 is depressed, the piston in the cylinder 34 will move forwardly, forcing the fluid therein into the supply pipe 36 then to equalizing chamber 33, from this point the fluid pressure will pass through the pipes 32 to pipes 31 and thence to the manifold 28 of each of the brakes. At this point the fluid pressure will be conducted to each of the cylinders 24, which will force the pistons 26 outwardly carrying the cone 16 and its lining 17 into contact with its respective brake drum, as for instance, the brake drum 11, as illustrated in Figure 3.

When the pressure is released from the pedal, the springs 21 will act to withdraw the cones to their normal position which is that shown in Figure 3.

It will thus be seen that the mechanism above described will perform all of the objects above set forth.

It is to be understood that the form of my invention herewith shown and described is to be taken as a preferred example of the same, and that various changes in the shape, size and arrangement of parts may be resorted to without departing from the spirit of the invention or the scope of the subjoined claim.

Having thus described my invention, I claim:—

In a hydraulic braking mechanism, a brake drum, a cone positioned within said brake drum, said cone having a flange formed thereon, a plurality of pistons positioned on said flange, a plate positioned adjacent said drum and in parallel alignment with said flange, a plurality of cylinders positioned on said plate and adapted to have said pistons mounted therein, bolts extending through said plate, a spring positioned on each of said bolts and adapted to normally retain said cone out of contact with said drum and a manifold connecting each of said cylinders.

In testimony whereof I affix my signature.

FOREST M. SARFF.